(12) United States Patent
Taniguchi

(10) Patent No.: US 7,203,530 B2
(45) Date of Patent: Apr. 10, 2007

(54) FOLDING PORTABLE TERMINAL CAPABLE OF OPERATING RESPONSIVE TO CONTENTS OF INCOMING BY BEING OPENED

(75) Inventor: Keiichi Taniguchi, Minato-ku (JP)

(73) Assignee: NEC Corporation, Tokyo (JP)

( * ) Notice: Subject to any disclaimer, the term of this patent is extended or adjusted under 35 U.S.C. 154(b) by 451 days.

(21) Appl. No.: 10/122,193

(22) Filed: Apr. 16, 2002

(65) Prior Publication Data

US 2002/0151296 A1 Oct. 17, 2002

(30) Foreign Application Priority Data

Apr. 16, 2001 (JP) ............... 2001-116692

(51) Int. Cl.
H04M 1/00 (2006.01)
H04M 3/42 (2006.01)
H04B 1/38 (2006.01)

(52) U.S. Cl. ............... 455/575.3; 455/412.2; 455/566; 455/567; 379/433.13

(58) Field of Classification Search ............ 455/575.3, 455/566, 567, 575, 412; 713/188
See application file for complete search history.

(56) References Cited

U.S. PATENT DOCUMENTS

| 5,493,690 | A | * | 2/1996 | Shimazaki | ............... 455/575.3 |
|---|---|---|---|---|---|
| 5,742,894 | A | * | 4/1998 | Jambhekar et al. | ...... 455/575.3 |
| 6,018,671 | A | * | 1/2000 | Bremer | ........................ 455/567 |
| 6,038,313 | A | * | 3/2000 | Collins | ................... 379/433.07 |
| 6,094,565 | A | * | 7/2000 | Alberth et al. | ........... 455/575.3 |
| 6,141,540 | A | * | 10/2000 | Richards et al. | ......... 455/575.3 |
| 6,269,256 | B1 | * | 7/2001 | Nakamura | ................... 455/567 |
| 6,493,548 | B1 | * | 12/2002 | Kinoshita | ................ 455/412.1 |
| 6,587,700 | B1 | * | 7/2003 | Meins et al. | .............. 455/575.8 |
| 6,615,058 | B2 | * | 9/2003 | Nagai | .......................... 455/566 |
| 6,842,861 | B1 | * | 1/2005 | Cox et al. | .................... 713/188 |
| 6,895,329 | B1 | * | 5/2005 | Wolfson | ..................... 701/209 |
| 2002/0019216 | A1 | * | 2/2002 | Horiguchi | ..................... 455/90 |

FOREIGN PATENT DOCUMENTS

| CN | 1207003 A | 2/1999 |
|---|---|---|
| EP | 1 209 879 A2 | 5/2002 |
| JP | A 2001-203786 | 7/2001 |
| JP | A 2002-51135 | 2/2002 |

* cited by examiner

Primary Examiner—Fan Tsang
Assistant Examiner—Lisa Hashem
(74) Attorney, Agent, or Firm—Young & Thompson

(57) ABSTRACT

In a case that a voice incoming or a mail is received at the folded condition of the portable terminal, the user can make the portable terminal conduct operations responsive to contents of the incoming or the received data, such as a voice talking or reading the received mail only by an operation for opening the portable terminal without doing off hook operation for the voice talking or operations for reading the mail.

20 Claims, 6 Drawing Sheets

FOLDING PORTABLE TERMINAL CAPABLE OF OPERATING RESPONSIVE TO CONTENTS OF INCOMING BY BEING OPENED

BACKGROUND OF THE INVENTION

The present invention relates to a folding portable terminal, in particular to a folding portable terminal which operates responsive to contents of incoming, when the folding portable terminal is transferred from a folded condition into an opened condition at the time of incoming or thereafter.

Conventionally, portable terminals, such as a folding portable telephone, and the like have come into wide use. Such a folding portable terminal generally waits for incoming at a folded condition thereof and is used at an opened condition thereof. Hereunder, description is made about a portable telephone capable of being folded into two parts as illustrated in FIG. 2 as an example of a conventional portable terminal. When the portable telephone is at "folded condition" illustrated in FIG. 2(A), an LCD (Liquid Crystal Display) portion 4 and a ten key portion 5 cannot be used. Namely, an user of the portable telephone cannot see the LCD portion 4 at the time of folding, since the LCD portion 4 is located on a plane of an upper housing 21 that will be kept in contact with a lower housing 20 at the time of folding. Similarly, the user of the portable telephone cannot use the ten key portion 5 at the time of folding, since the ten key portion 5 is located on a plane of the lower housing 20 that will be kept in contact with the upper housing 21 at the time of folding. Accordingly, in order to use a talking function or a mail function of the portable telephone illustrated in FIG. 2, it is necessary for the user to transfer the portable telephone from the "folded condition" illustrated in FIG. 2(A) into the "opened condition" illustrated in FIG. 2(B). In other words, it is necessary to open the lower housing 20 and the upper housing 21 by using a hinge portion 22 as a center and to expose the ten key portion 5, the LCD portion 4, or the like, that is, an user interface for using the talking function or the mail function, to the outside.

Next, referring to FIG. 6, description is made in detail as regards an example of actions by an user using such a conventional portable terminal, a method of operating the conventional portable terminal, and the like. In FIG. 6, illustrated is a flow chart for explaining actions and operations carried out by the user until the user reads a received mail, in a case that the conventional portable telephone receives the mail at the folded condition. Besides, the portable telephone has a structure in which the upper housing 21 and the lower housing 20 are connected by the hinge portion 22, as illustrated in FIG. 2. Further, as illustrated in FIG. 1, the portable telephone comprises a radio portion 1, a control portion 2, a voice signal processing portion 3, the LCD portion 4, the ten key portion 5, a receiver/microphone portion 6, an ROM (Read Only Memory) portion 7, an RAM (Random Access Memory) portion 8, and an open and close detecting portion 9. In addition, the portable telephone is being supplied with electric power and waiting for incoming at the folded condition thereof (at an waiting condition).

At first, the control portion 2 monitors whether or not the portable telephone 11 is not only at the folded condition but also at the waiting condition (step S11). Namely, if the portable telephone 11 is folded to be waiting for incoming, nothing is required to be displayed, for example, in the LCD portion 4. Power supply for the LCD portion 4 can therefore be off. In other words, it is enough to monitor whether or not the portable telephone 11 is transferred into the opened condition and incoming from a network is received. It is thereby not necessary to conduct the other controls, and the like. As a result, a holding electric power can be reduced extremely.

When a notice of incoming of a packet addressed to the portable telephone 11 is received from the network during the waiting time, the control portion 2 makes the radio portion 1 conduct a reception processing of the body of a received mail (step S12). After receiving the body of the received mail, the control portion 2 informs the user of the reception of the mail by making the receiver/microphone portion 6 ring an incoming indicator tone (step S13).

When the user has confirmed the incoming indicator tone, the user generally reads the above mail. Accordingly, the control portion 2 informs the user of the reception of the mail, as mentioned above, so that the portable telephone 11 is transferred into the opened condition (opening condition) by the user (step S14). Besides, the control portion 2 may make the LCD portion 4 display a message "A mail has arrived" (mail receiving message), after the portable telephone 11 has been transferred into the opening condition (step S15). Thereafter, indication for displaying the body of the mail in the LCD portion 4 is input by the user through the ten key portion 5 (step S16). The body of the received mail is thereby displayed in the LCD portion 4.

However, in the conventional portable terminal mentioned above, the user cannot make the portable terminal conduct an operation responsive to contents of incoming until the user has completed both an action for opening the portable terminal and an action for inputting a predetermined indication to the portable terminal by using the user interface, such as the ten key portion 5, and the like. Accordingly, many processes and much time ate inevitably required for the user while the user comes to know the fact of the incoming and then reads the received mail.

Especially, the problem becomes serious, in a case that a voice call is received by the conventional portable terminal. A person who calling up the user generally rings off his telephone used by himself, so far as his telephone is not turned into a talking condition within a certain time after he has sent a notice of incoming from his telephone to the portable telephone 11. In other words, when the user fails to put the portable telephone 11 into the talking condition (when the user fails to answer the portable telephone 11) within a certain time after the portable telephone 11 has started ringing, the person who calling up the user makes his telephone stop the sending of notice of incoming (the person who calling up the user hangs up the receiver). Therefore, it is necessary for the user to conduct talking operations by using the ten key portion 5, and the like to transfer the portable telephone 11 into the talking condition with the above person within a limited time after the notice of incoming of the voice call has been received.

SUMMARY OF THE INVENTION

It is therefore an object of the present invention to provide a folding portable terminal which is capable of operating responsive to contents of incoming by being transferred into an opened condition thereof by an user, when the incoming is received at a folded condition thereof.

It is another object of the present invention to provide a folding portable terminal which especially has a mail receiving function and which is capable of providing an user with a mail, for example, by displaying the mail in an LCD thereof without the user's operation for reading the mail by being transferred into an opened condition thereof by the user, when the mail is received at a folded condition thereof.

It is yet another object of the present invention to provide a folding portable terminal which has a talking (communication) function and which is capable of being transferred into a talking condition with a person who calling up an user without the user's operation for talking with the person by being transferred into an opened condition thereof by the user, when an incoming of the talking (communication) is received at a folded condition thereof.

Other objects of the present invention will become clear as the description proceeds.

According to an aspect of the present invention, there is provided a folding portable terminal characterized in that the folding portable terminal operates responsive to contents of incoming by being transferred from a folded condition into an opened condition, when the incoming occurs at the folded condition of the portable terminal.

The folding portable terminal may operate responsive to contents of said incoming by being transferred from said folded condition into said opened condition, when the incoming occurs at the folded condition of the portable terminal from a predetermined person or terminal that communicating with the user or the folding portable terminal.

The folding portable terminal may notify an user of the folding portable terminal of information for a person or terminal that communicating with the user or the folding portable terminal and thereafter operates responsive to contents of said incoming by being transferred from said folded condition into said opened condition.

The folding portable terminal may be characterized in that said folding portable terminal displays a mail in a display portion by being transferred from a folded condition into an opened condition after receiving the mail at the folded condition of the portable terminal.

The folding portable terminal, by being transferred from a folded condition into an opened condition after receiving the data from a predetermined person or terminal that communicating with the user or the folding portable terminal, may select a function capable of using the data and then use the data by the selected function.

The folding portable terminal, by being transferred from a folded condition into an opened condition while real time communication data are received at the folded condition, may become capable of communicating with a person or terminal that communicating with the user or the folding portable terminal.

The folding portable terminal may be characterized in that said real time communication data are received from a predetermined person or terminal that communicating with the user or the folding portable terminal.

DETAILED DESCRIPTION OF THE PREFERRED EMBODIMENTS

Referring to FIGS. 1, 3, 4 and 5 with reference to FIG. 2 continued, description will proceed to a wireless portable terminal according to the present invention.

Figure 2A:
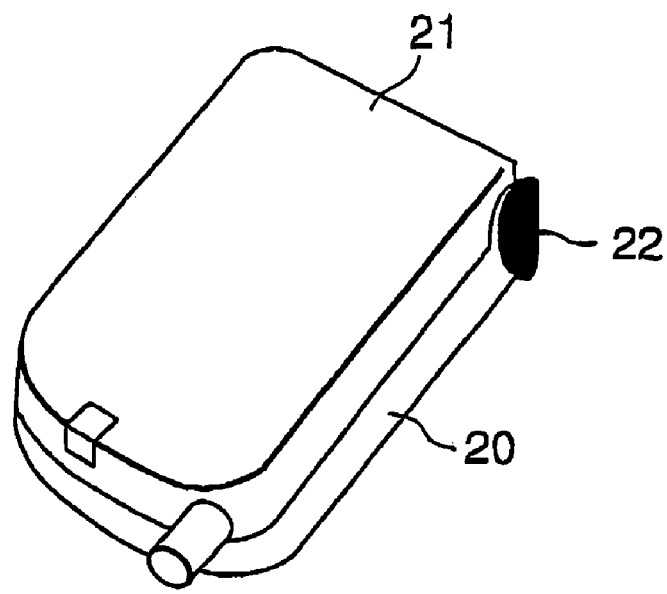
FIGS. 2(A) and 2(B) are views for schematically showing an external constitution of the folding portable telephone capable of being folded into two parts, 2(A) is the view when the folding portable telephone is at "folded condition" while 2(B) is the view when the folding portable telephone is at "opened condition"
Figure 2B:
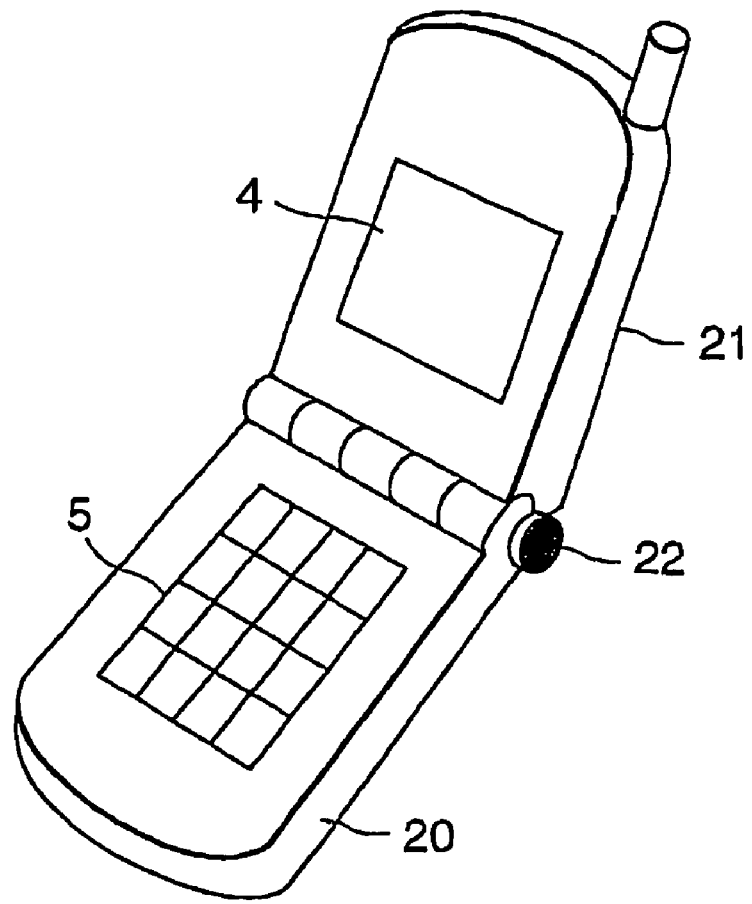

The wireless portable terminal according to the present invention operates responsive to contents of incoming, when the wireless portable terminal is transferred from a folded condition illustrated in FIG. 2(A) into a general condition (a condition that the wireless portable terminal is opened) illustrated in FIG. 2(B) at the time of incoming and thereafter. In other words, the wireless portable terminal according to the present invention conducts a predetermined operation by a trigger that the wireless portable terminal is opened by an user, when an incoming is received at the folded condition.

For example, when a housing of two parts is opened at the time of a voice incoming (at the time of incoming of voice talking), the wireless portable terminal according to the present invention, it becomes possible that the user has talking with a person who calling up the user. Namely, when the wireless portable terminal is transferred from a folded condition into an opened condition during incoming of real time communication data, such as a voice incoming, and the like, the wireless portable terminal becomes capable of being transferred into a talking condition with the person who calling up the user without the user's operation for talking with the person.

Further, when the wireless portable terminal is transferred from a folded condition into an opened condition at the time of incoming of data, such as a mail, and the like (including a program) or after the incoming thereof, the wireless portable terminal conducts an operation responsive to the data. Namely, when the wireless portable terminal is transferred from a folded condition into an opened condition after reception of the data, the wireless portable terminal selects a function for using the data and then uses the data by the selected function. For example, in a case that image data is received, the wireless portable terminal selects a function for displaying the image data in a display portion and then displays the image data in the display portion. Especially, in a case that the received data is a mail, the wireless portable terminal displays the mail in the display portion. On the other hand, in a case that the received data is a program, the wireless portable terminal starts the program.

Thus, the user can make the wireless portable terminal start a function responsive to contents of incoming by transferring the wireless portable terminal from a folded condition into an opened condition at the time of the incoming.

Besides, the wireless portable terminal may provide information for the person who has transmitted the data or the program (the person who calling up the user) at the time of the incoming. Namely, upon confirming the person who calling up the user, the user may decide whether or not the wireless portable terminal should be opened, in other words, whether or not the user makes the wireless portable terminal conduct an operation responsive to contents of the incoming.

Further, only when the incoming is received from persons who have previously been registered by the user, the wireless portable terminal may conduct the above-mentioned operation, and/or when the incoming is received from persons who have previously been registered by the user, the wireless portable terminal may not conduct the above-mentioned operation.

Moreover, before the wireless portable terminal starts a function capable of using the data or the program, what is called, a virus check may be carried out for the data or the program.

Now, referring to FIGS. 1, 3, 4 and 5 with reference to FIG. 2 continued, description proceeds to a wireless portable terminal according to preferred embodiments of the present invention.

First Embodiment

In the first embodiment, a folding portable telephone is described as an example of a folding portable terminal according to the preferred embodiment of the present invention. Namely, the terminal at least capable of a voice talking with a person who is communicating with the user (having a talking function; capable of a real time communication) is described as the example of the folding portable terminal according to the preferred embodiment of the present invention. Besides, as the talking function, for example, a wireless-phone communication (talking) function corresponding to RCR-STD27, that is, a standard specification in Japan can be employed. However, the talking function is not restricted to the wireless-phone communication (talking) function corresponding to RCR-STD27.

Figure 1:
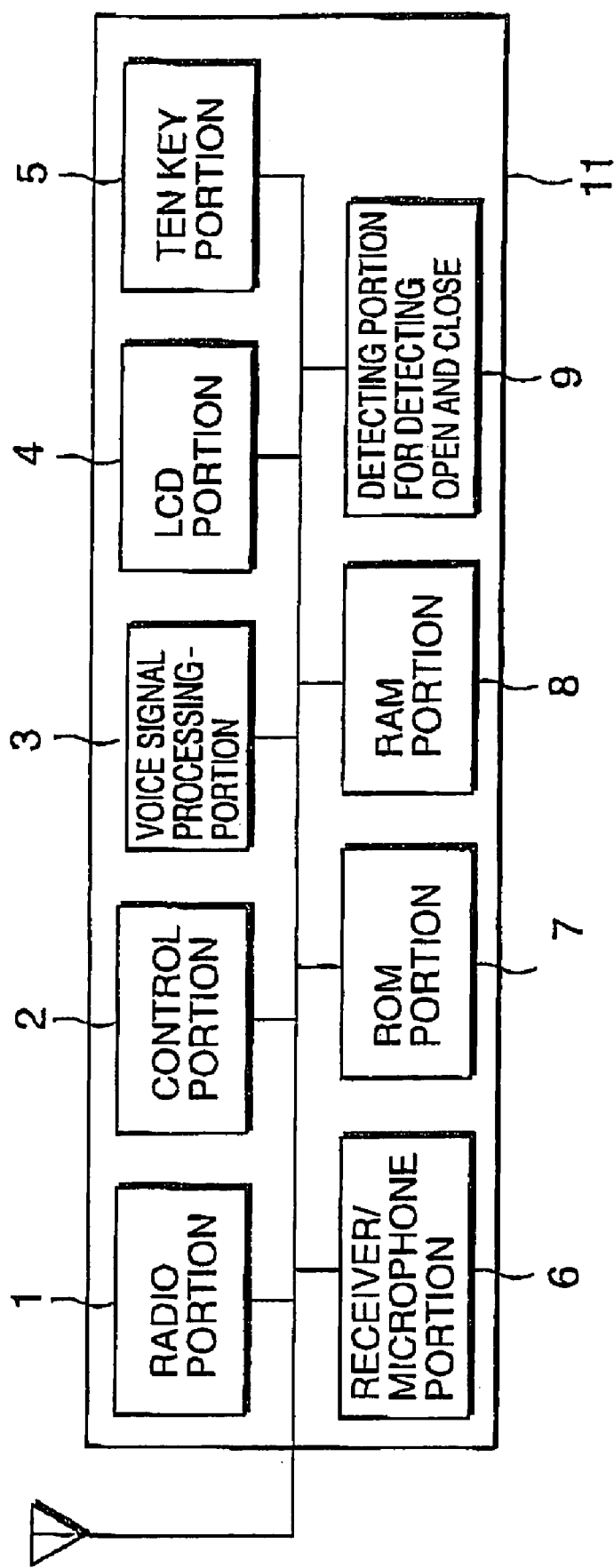
FIG. 1 is a block diagram for schematically showing an internal constitution of a folding portable telephone according to a first embodiment of the present invention.

In FIG. 1, illustrated is an example of a block diagram of a portable telephone 11 capable of realizing the present invention. The portable telephone 11 has a constitution that can be folded by a hinge structure. As illustrated in FIG. 1, the portable telephone 11 comprises a radio portion 1, a control portion 2, a voice signal processing portion 3, a ten key portion 5, a receiver/microphone portion 6, an ROM (Read Only Memory) portion 7, an RAM (Random Access Memory) portion 8, and an open and close detecting portion 9. In addition, the portable telephone 11 may further comprise an LCD portion 4.

The radio portion 1 transmits or receives data in accordance with a predetermined protocol by the use of a radio circuit. The control portion 2 controls each portion illustrated in FIG. 1 by a program previously stored in the ROM portion 7. The voice signal processing portion 3 converts a voice signal input from a microphone of the receiver/microphone portion 6 into a digital signal. Further, the voice signal processing portion 3 converts a received digital signal into a voice signal to be transmitted to a speaker of the receiver/microphone portion 6. The LCD portion 4 displays information, such as various messages, and the like, to the user under the control of the control portion 2. The ten key portion 5 is an user interface through which various information are input by the user and various indications are input by the user during talking. The receiver microphone portion 6 outputs a voice signal converted from the digital signal by the voice signal processing portion 3. In addition, a voice signal is input to the receiver/microphone portion 6. Further, the receiver/microphone portion 6 rings an incoming indicator tone at the time of incoming of a voice talking or a mail. The ROM portion 7 previously stores a program of the portable telephone 11 for enabling the control portion 2 to be operable. It is impossible for a general user to rewrite the program stored in the ROM portion 7, even if the user operates the portable telephone 11 to rewrite the program. The RAM portion 8 temporarily stores working data, when the control portion 2 carries out various operations. Further, the RAM portion 8 temporarily stores installed information from the user. The open and close detecting portion 9 detects whether or not the portable telephone 11 is at a folded condition.

In FIG. 2, illustrated is an example of an external constitution of the portable telephone 11. FIG. 2(A) shows an external constitution of the portable telephone 11 which is at the folded condition. Thus, the portable telephone 11 has a structure in which the lower housing 20 and the upper housing 21 can be folded double by using the hinge portion 22 as an axis. Besides, it is enough for a portable terminal according to the present invention to be folded. The present invention can be applied to any portable terminals other than that having a structure of the hinge or a structure folded double. Namely, the present invention can be applied to a portable terminal, only if the portable terminal is opened to be generally used. It is enough for the portable terminal 11 to be at the opened condition at least in a case of talking with the other person by the portable terminal 11.

FIG. 2(B) shows an external constitution of the portable telephone 11 which is at the opened condition. As is clearly understood from FIGS. 2(A) and 2(B), the portable telephone 11 has a structure which is transferred from the folded condition into the opened condition by drawing the lower housing 20 and the upper housing 21 each other with the hinge portion 22 being used as an axis. Further, as illustrated in FIG. 2(B), the ten key portion 5 is formed on a plane of the lower housing 20 which will be kept in contact with the upper housing 21. It is preferable that the LCD portion 4 is formed on a plane of the upper housing 21 which will be kept in contact with the lower housing 20 similarly. Thus, the ten key portion 5 and the LCD portion 4 are formed on the planes inside the folded portable telephone 11. Accordingly, let the portable telephone 11 be at the folded condition, when the portable telephone 11 is not used, for example, during waiting condition. As a result, the ten key portion 5 and the LCD portion 4 are seldom injured. On the other hand, a portable telephone having no folding mechanism always displays something in an LCD portion thereof. However, the portable telephone 11 is a folding portable telephone. The portable telephone 11 is therefore not required for displaying anything in the LCD portion 4, when the portable telephone 11 is at the folded condition. This brings meritorious effects that electric power during waiting condition is extremely reduced, or the like. Accordingly, in the following description, it is assumed that the user keeps or hands the portable telephone 11 at the folded condition.

Figure 3A:
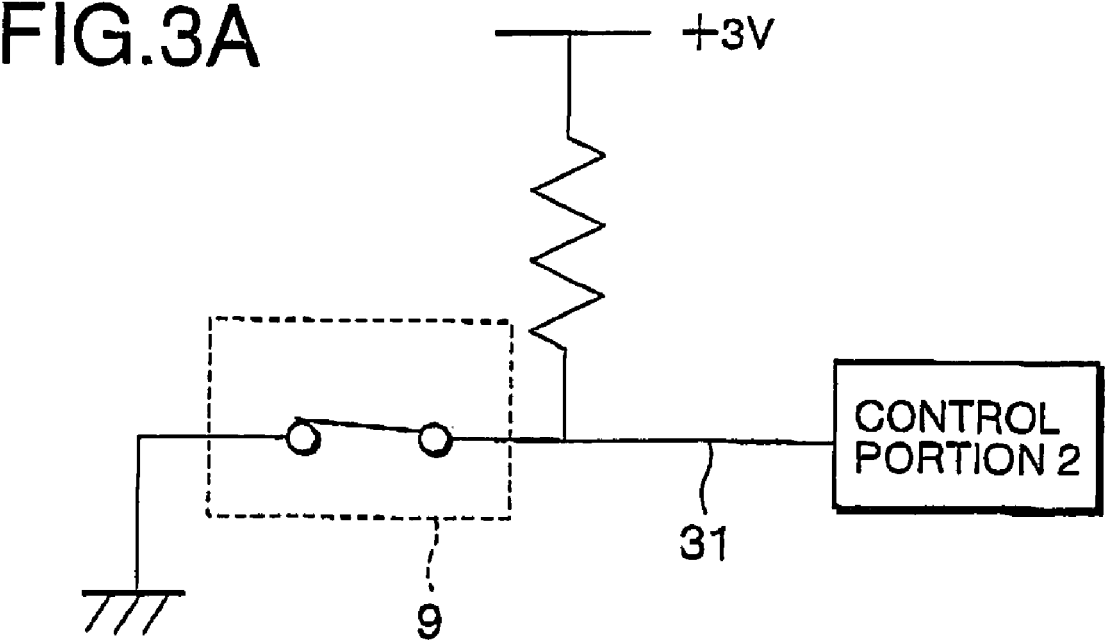
FIGS. 3(A) and 3(B) are views for schematically showing an example of operation of an open and close detecting portion 9 in the folding portable telephone illustrated in FIG. 1, 3(A) is the view when the folding portable telephone is at "folded condition" while 3(B) is the view when the folding portable telephone is at "opened condition"
Figure 3B:
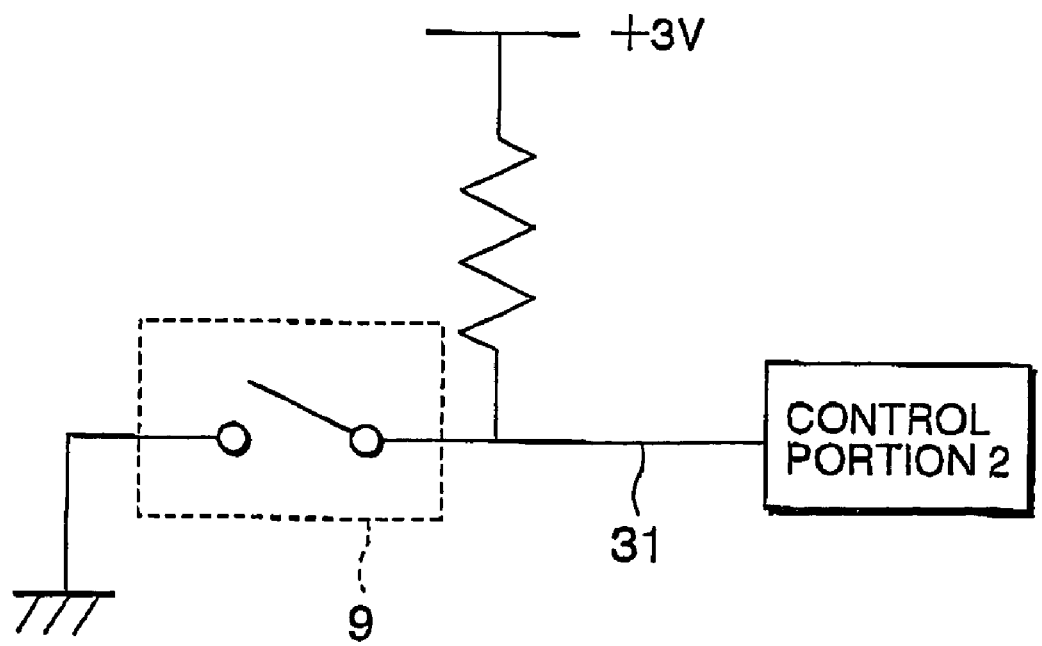

FIGS. 3(A) and 3(B) are views for explaining a function for detecting open and close of the portable telephone 11, namely, an example of operations of the open and close detecting portion 9. The open and close detecting portion 9 is connected to the control portion 2 through an input line 31 for detecting open and close. The control portion 2 always monitors a voltage of the input line 31 for detecting open and close. In particular, the open and close detecting portion 9 alters a voltage to be input to the control portion 2 through the input line 31 for detecting open and close, dependent on whether the portable telephone 11 is at the folded condition or the opened condition. For example, a switch within the open and close detecting portion 9 is ON at the folded condition, as illustrated in FIG. 3(A). On the other hand, the switch within the open and close detecting portion 9 is OFF at the opened condition, as illustrated in FIG. 3(B). As a result, the control portion 2 can judge whether the portable telephone 11 is at the folded condition or the opened condition. Namely, the control portion 2 can judge that the portable telephone 11 is at the folded condition, when the voltage of the input line 31 for detecting open and close is 0V. On the contrary, the control portion 2 can judge that the portable telephone 11 is at the opened condition, when the voltage of the input line 31 for detecting open and close is 3V.

In other words, when the portable telephone 11 is at the waiting condition and the folded condition with the power supply for the portable telephone 11 is ON, the open and close detecting portion 9 renders the voltage of the input line 31 for detecting open and close to be 0V upon recognizing the "close" of the portable telephone 11 [FIG. 3(A)]. On the other hand, the open and close detecting portion 9 changes the voltage of the input line 31 for detecting open and close from 0V into 3V, upon recognizing the change from "open" into "close", when the user opens the portable telephone 11. Thereby, the control portion 2 recognizes that the condition of the portable telephone 11 has become "open". Thus, the control portion 2 recognizes whether the portable telephone 11 is at "close" condition or "open" condition.

Besides, the open and close detecting portion 9 may detect whether the portable telephone 11 is at the folded condition or the opened condition by the use of an well-known method.

Figure 4:
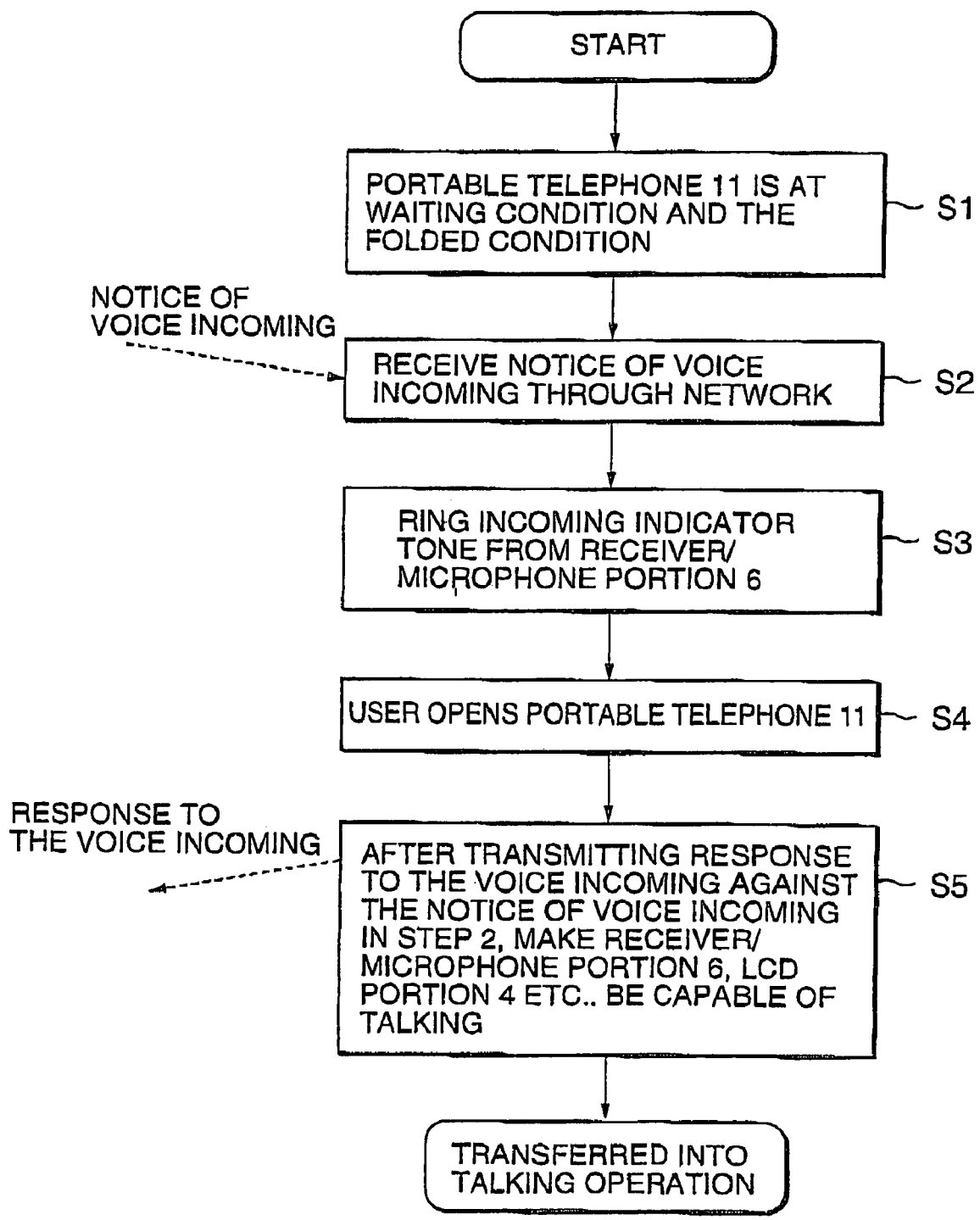
FIG. 4 is a flow chart for explaining operations of the folding portable telephone according to the present invention, in a case that a voice incoming is received at the folded condition.

Now, referring to FIG. 4, description is made about operations of the portable telephone 11, in a case that a voice incoming is received at the folded condition (close condition). FIG. 4 is a flow chart for explaining the operations of the portable telephone 11, in a case that a voice incoming is received at the folded condition.

As described above, the control portion 2 always monitors whether or not the portable telephone 11 is at the folded condition through the open and close detecting portion 9 (step S1). At this stage, it is assumed that the portable telephone 11 is at the folded condition. In this condition, a notice of a voice incoming is then input to the portable telephone 11 from a network (step S2).

Upon recognizing the notice of a voice incoming through the radio portion 1, the control portion 2 makes the receiver/microphone portion 6 ring an incoming indicator tone and thereby notifies the user of the voice incoming (step S3). The user confirms the voice incoming by the incoming indicator tone. When the user wishes to have a talking, the user transfers the portable telephone 11 into the opened condition so as to have the talking (step S4). When the portable telephone 11 is transferred into the opened condition, the open and close detecting portion 9 changes the voltage of the input line 31 for detecting open and close from 0V into 3V. Thereby, the control portion 2 recognizes that the portable telephone 11 has become the opened condition.

Upon recognizing that the portable telephone 11 is transferred from the closed condition into the opened condition, the control portion 2 replies a response for the voice incoming to a person who calling up the user (originating source terminal) through a network, when the incoming is continuously received from the person who calling up the user. Namely, the control portion 2 enables the receiver/microphone portion 6, the radio portion 1, and the like to be used for a general talking (step S5). Accordingly, when the incoming is received, the user becomes capable of talking with the person who calling up the user only by transferring the portable telephone 11 from the folded condition into the opened condition.

Second Embodiment

In the second embodiment, a portable terminal 11 is described as an example of a folding portable terminal according to the preferred embodiment of the present invention. Namely, the portable terminal 11 is an apparatus capable of transmitting and receiving an electronic mail (E-mail) by the use of a wireless packet (data) communication function.

As illustrated in FIG. 1, the portable terminal 11 comprises at least a radio portion 1, a control portion 2, an LCD portion 4, a ten key portion 5, an ROM (Read Only Memory) portion 7, an RAM (Random Access Memory) portion 8, and an open and close detecting portion 9. In addition, the portable terminal 11 may further comprise a voice signal processing portion 3 and a receiver/microphone portion 6 to be capable of also the voice talking, similarly to the first embodiment.

Figure 5:
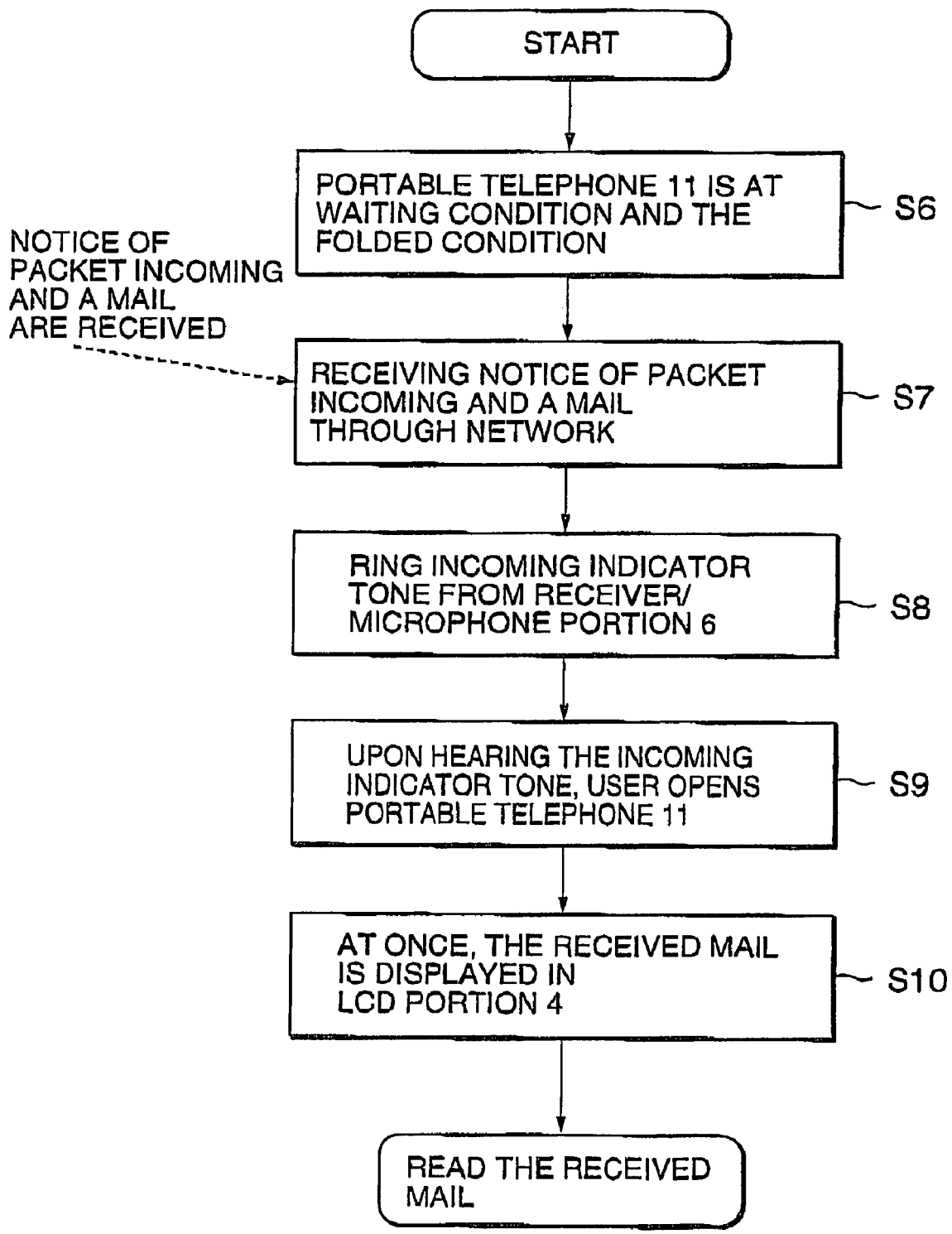
FIG. 5 is a flow chart for explaining operations of the folding portable terminal according to the present invention, in a case that an electronic mail is received at the folded condition.
Figure 6:
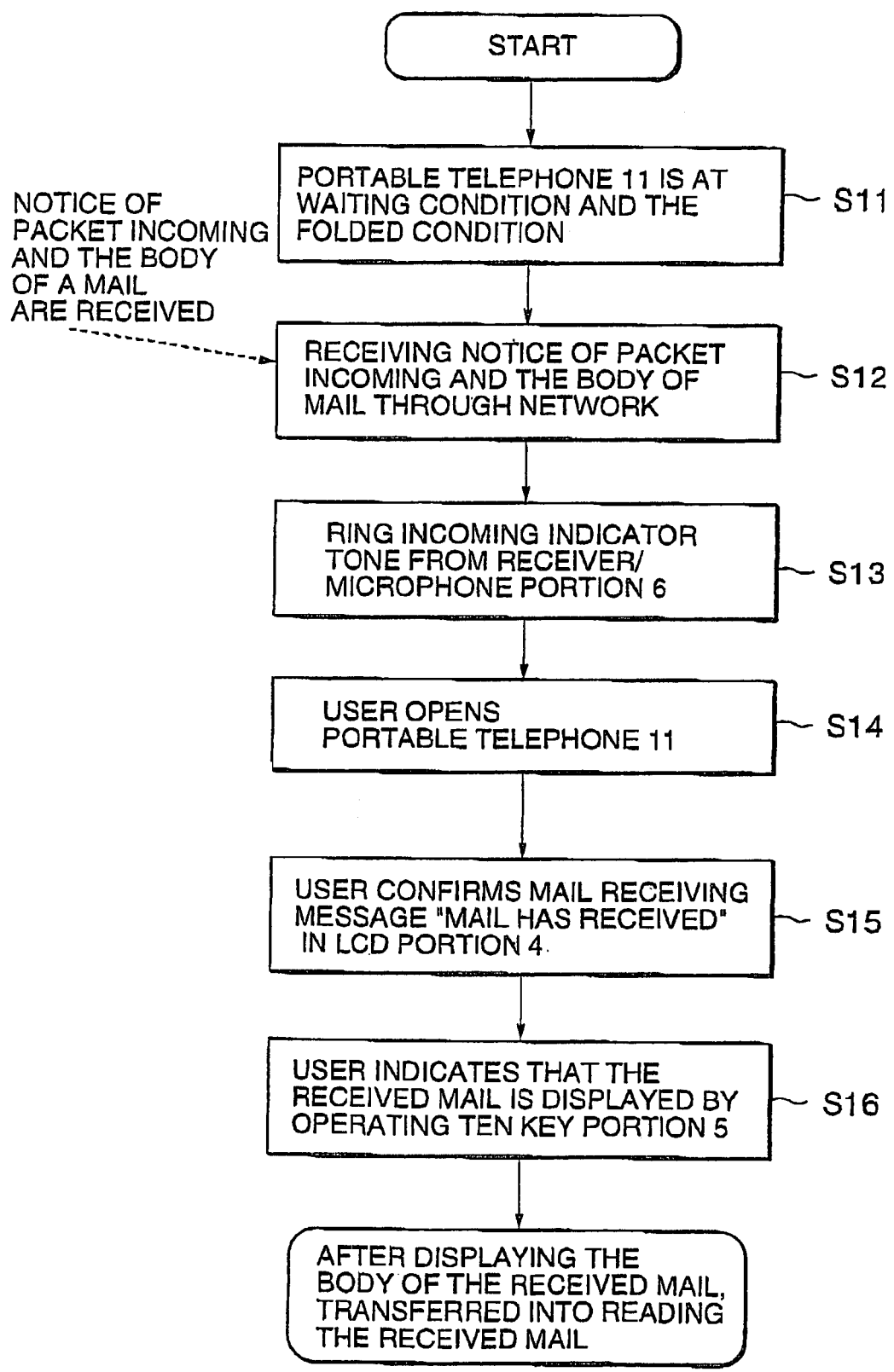
FIG. 6 is a flow chart for explaining operations of the conventional folding portable telephone, in a case that the conventional folding portable telephone receives a mail incoming at the folded condition.

Now, referring to FIG. 5, description is made about operations of the portable terminal 11, in a case that an electronic mail is received by the portable terminal 11 during the folded condition thereof. FIG. 5 is a flow chart for explaining the operations of the portable terminal 11, in a case that an electronic mail is received at the folded condition.

As described above, it is assumed that the portable terminal 11 is at the waiting condition and the folded condition with the power supply for the portable terminal 11 is ON. As a result, the control portion 2 recognizes that the portable terminal 11 is at the folded condition from the open and close detecting portion 9 through the input line 31 for detecting open and close (step S6). In this example, the open and close detecting portion 9 renders the voltage of the input line 31 for detecting open and close to be 0V. The control portion 2 can thereby recognize that the portable terminal 11 is at the folded condition.

Herein, a notice of a packet incoming addressed to the portable terminal 11 is received from a terminal of the person who transmitting the mail through a network. Continuously, the body of the mail is received by the portable terminal 11 (step S7). Conventionally well-known methods for receiving an electronic mail can be used as the method for receiving the mail in the portable terminal 11.

Upon receiving the mail, the control portion 2 makes the receiver/microphone portion 6 ring an incoming indicator tone and thereby notifies the user of the incoming of the mail (step S8). The user confirms the incoming of the mail by the incoming indicator tone. When the user wishes to read the mail, the user transfers the portable terminal 11 from the folded condition into the opened condition (step S9).

After receiving the mail during the folded condition, when the portable terminal 11 is transferred into the opened condition, the control portion 2 makes the LCD portion 4 display the received mail in the LCD portion 4 (step S10). As a result, the user can read the received mail by the portable terminal 11.

As will be understood from the description mentioned above, the portable terminal according to the present invention conducts a predetermined operation by a trigger that the portable terminal is opened by an user, when an incoming is received at the folded condition. For example, in a case that a mail is received, the portable terminal displays the mail in the display portion by being opened from the folded condition. As a result, the user can read the mail only by opening the portable terminal. It is not necessary for the user to conduct any other operations for reading the mail.

Further, in a case of a voice incoming, the portable terminal becomes off hook condition by being opened from the folded condition. As a result, the user can be capable of talking with the person who communicating with the user only by opening the portable terminal. It is not necessary for the user to conduct any other operations for talking with the person.

Accordingly, the user can give an indication for operations responsive to contents of incoming at the folded condition, such as an indication for displaying a mail, to the portable terminal only by opening the portable terminal. It becomes unnecessary for the user to conduct predetermined operations by the use of an user interface so as to give such an indication for the operations. As a result, operability by the user can be improved.

Namely, in a case that a voice incoming or a mail is received at the folded condition of the portable terminal, the user can make the portable terminal conduct operations responsive to contents of the incoming or the received data, such as a voice talking or reading the received mail only by an operation for opening the portable terminal without doing off hook operation for the voice talking or operations for reading the mail.

While this invention has thus far been described in conjunction with two embodiments thereof, it will now be readily possible for one skilled in the art to put this invention into effect in various other manners. For example, the user may keep or cancel the setting whether or not the voice talking operation and/or mail reading operation are/is carried out, when the portable terminal is opened. Further, in the above embodiments, the portable terminal notifies the user of the incoming by a sound. The portable terminal may alternatively notify the user of the incoming by any other methods. It is alternatively possible that the portable terminal does not notify the user of the incoming. Further, an incoming indicator tone or the other methods for notifying the user of the incoming may be changed, dependent on contents of the received data or the person who communicating with the user. Of course, these functions can be given, dependent on the persons who communicating with the user. In other words, these functions can be given for a part of the persons who communicating with the user. Further, in a portable terminal having a plurality of functions, for example, a mail function and a talking function, it can be selected whether or not the above-mentioned operations are carried out per each function. In this case, for example, when the portable terminal is transferred from the folded condition into the opened condition at the time of incoming and/or after the incoming, only the mail function or only the talking function may be operable responsive to contents of the incoming.

Moreover, in a case that the portable terminal notifies the user of the persons who communicating with the user, as mentioned above, preferably, the user can indicate, while opening the portable terminal or before opening the portable terminal, that the portable terminal does not operate responsive to contents of incoming by a trigger that the portable terminal is transferred into the opened condition. For example, a button capable of being pushed at the folded condition illustrated in FIG. 2(A) can be formed in the portable terminal. The portable terminal does not operate responsive to contents of incoming, when the portable terminal is transferred into the opened condition after the button has been pushed by the user. Namely, if the user does not wish to use the received data (including a program), the user can push the button and then open the portable terminal. However, the portable terminal may have this function, even if the portable terminal does not notify the user of the persons who communicating with the user.

As a method of notifying the user of the persons who communicating with the user or kinds of the received data (whether the received data is a voice talking or a mail), any methods can be employed other than the above-described method using the incoming indicator tone. For example, a display portion capable of being confirmed by human eyes from the outside even at the folded condition illustrated in FIG. 2(A) can be formed in the portable terminal. The persons who communicating with the user or kinds of the received data may be displayed in the display portion.

What is claimed is:

1. A folding portable terminal that operates responsive to contents of an incoming communication when being transferred from a folded condition into an opened condition, comprising:

a first part with an upper surface;

a second part with an upper surface;

a hinge hinging the first part to the second part and providing a first, closed folded position where the upper surfaces of the first and second parts are adjacently facing each other and a second, opened unfolded position where the upper surfaces of the first and second parts are not facing each other and are exposed to a user;

a first circuit detecting the first and second parts being opened from the closed folded position to the opened unfolded position;

a selector determining a specific communication mode of the incoming communication from plural alternative communication modes that the terminal is capable of receiving, the determination being a data analysis of a contents data type of the incoming communication; and an activation part that, upon the first circuit detecting the first and second parts being opened from the closed folded position to the opened unfolded position, activates the terminal for outgoing communications in the specific communication mode determined by the selector, so that the user may immediately conduct out-going communications in the specific communication mode upon opening the first and second parts to the open unfolded position;

a button, user operable in the closed folded position during an initial reception of the incoming communication and prior to the activation part activating the terminal for out-going communications, enabling the user to open the terminal for immediate out-going communications and to trigger the portable terminal to suppress operation of the activation part so that the activation does not cause the terminal to operate responsive to the contents of the incoming communications upon opening the first and second parts from the closed folded position to the opened unfolded position, wherein, in the closed folded position the terminal is inactive for out-going communications and the terminal must be opened to the opened unfolded position to initiate outgoing communications, the data analysis of the selector causes the activation part to activate the terminal for out-going communications in the specific communication mode so that the user may immediately conduct out-going communications in the specific communication mode upon opening the first and second parts to the open unfolded position, and the user operating the button results in the portable terminal being immediately available for out-going communications but not operating responsive to the contents of the incoming communications when being transferred from a folded condition into an opened condition and the activation part not activating the terminal for out-going communications in the specific communication mode determined by the selector.

2. A folding portable terminal as claimed in claim 1, characterized in that said folding portable terminal operates the selector responsive to the contents data type of said incoming communication, only when the incoming communication occurs at the folded condition of the portable terminal from a predetermined, registered person or registered terminal.

3. A folding portable terminal as claimed in claim 2, characterized in that said folding portable terminal notifies a user of the folding portable terminal of information for a person or terminal that communicating with the user or the folding portable terminal and thereafter operates responsive to the contents data type of said incoming by being transferred from said folded condition into said opened condition.

4. A folding portable terminal as claimed in claim 1, characterized in that said folding portable terminal notifies the user of the folding portable terminal of information for a person or terminal that communicating with the user or the folding portable terminal and thereafter operates responsive to the contents data type of said incoming by being transferred from said folded condition into said opened condition.

5. A folding portable terminal as claimed in claim 1, characterized in that said folding portable terminal displays a mail in a display portion by being transferred from a folded condition into an opened condition after receiving the mail at the folded condition of the portable terminal.

6. A folding portable terminal as claimed in claim 5, characterized in that, by being transferred from a folded condition into an opened condition after receiving data from a predetermined person or terminal that communicating with the user or the folding portable terminal, said folding portable terminal selects a function capable of using the data and then uses the data by the selected function.

7. A folding portable terminal as claimed in claim 5, characterized in that, by being transferred from a folded condition into an opened condition while real time communication data are received at the folded condition, said folding portable terminal becomes capable of communicating with a person or terminal that communicating with the user or the folding portable terminal.

8. A folding portable terminal as claimed in claim 7, characterized in that said real time communication data are received from a predetermined person or terminal that communicating with the user or the folding portable terminal.

9. A folding portable terminal as claimed in claim 1, wherein, when an incoming voice communication is received, the data analysis determines that the contents data type is voice communications and the terminal is activated, upon opening, for outgoing voice communications so that the user, after opening the terminal, immediately begins out-going voice communications;

when an incoming mail communication is received, the data analysis determines that the contents data type is a mail communication and the terminal is activated, upon opening, for out-going mail communications;

when the terminal is transferred from a folded condition into an opened condition after reception of mail data, the terminal selects a function for using the data and then uses the data by the selected function, the selected function including displaying image data in a display portion;

the terminal determines whether an incoming communication is from persons who have previously been registered by the user, and the activation part activates the terminal for out-going communications for when the incoming communication is determined to be from a registered person; and when an incoming data communication is received, the data analysis determines that the contents data type is a data communication and the terminal is activated, upon opening, for data communications.

10. The terminal of claim 1, wherein, the data analysis determination of the contents data type of the specific communication mode of the incoming communication to be a voice communication causes the activation part to activate the terminal for immediate outgoing voice communications upon opening the first and second parts to the open unfolded position, the data analysis determination of the contents data type of the specific communication mode of the incoming communication to be an image data communication of image data causes the activation part to activate the terminal for immediate display of the image data upon opening the first and second parts to the open unfolded position, and the data analysis determination of the contents data type of the specific communication mode of the incoming communication to be a mail data communication of mail data causes the activation part to activate the terminal for immediate display of the mail data upon opening the first and second parts to the open unfolded position.

11. The terminal of claim 1, wherein, determining the contents data type to be a voice communication activates the terminal, upon opening the first and second parts to the open unfolded position, in a voice mode;

determining the contents data type to be an e-mail communication activates the terminal, upon opening the first and second parts to the open unfolded position, an e-mail communication mode; and determining the contents data type to be an image data communication activates the terminal, upon opening the first and second parts to the open unfolded position, in an image communication mode.

12. The terminal of claim 1, wherein, determining the incoming communication to be a voice communication activates the terminal, upon opening the first and second parts to the open unfolded position, in a voice mode;

determining the incoming communication to be an e-mail communication activates the terminal, upon opening the first and second parts to the open unfolded position, in an e-mail communication mode; and determining the incoming communication to be an image data communication activates the terminal, upon opening the first and second parts to the open unfolded position, in an image communication mode.

13. A folding communication terminal, comprising:
a first part with an upper surface;
a second part with an upper surface;
a hinge hinging the first part to the second part and providing a first, closed folded position where the upper surfaces of the first and second parts are adjacently facing each other and a second, open unfolded position where the upper surfaces of the first and second parts are not facing each other and are exposed to a user;
a first circuit detecting the first and second parts being opened from the closed folded position to the open unfolded position;
a selector determining a specific communication mode, of the incoming communication from plural alternative communication modes that the terminal is capable of receiving, by analysis of a contents data type of the incoming communication;
an activation part that, upon the first circuit detecting the first and second parts being opened from the closed folded position to the open unfolded position, activates the terminal for outgoing communications in the specific communication mode based on the contents data type determined by the selector, so that the user may immediately conduct outgoing communications in the specific communication mode upon opening the first and second parts to the open unfolded position, wherein, in the closed folded position the terminal is inactive for out-going communications; and
a button, user-operable in the closed folded position when the terminal is inactive for out-going communications, enabling the user to trigger the portable terminal not to operate responsive to the contents of the incoming communications upon opening the first and second parts from the closed folded position to the opened unfolded position so that the user operating the button results in the portable terminal being ready for immediate out-going communications but not operating responsive to the contents of the incoming communications when being transferred from a folded condition into an opened condition and the activation part not activating the terminal for out-going communications in the specific communication mode determined by the selector.

14. A wireless portable folding communication terminal, comprising:
a first part with an upper surface;
a second part with an upper surface;
a hinge hinging the first part to the second part and providing a first, closed folded position where the upper surfaces of the first and second parts are adjacently facing each other and a second, open unfolded position where the upper surfaces of the first and second parts are not facing each other and are exposed to a user;
a first circuit detecting the first and second parts being opened from the closed folded position to the open unfolded position; and
an activation part that, upon the first circuit detecting the first and second parts being opened from the closed folded position to the open unfolded position, activates the terminal for outgoing communications in a specific communication mode responsive to a determination of a content data type of the incoming communication, so that the user may immediately conduct out-going communications in the specific communication mode upon opening the first and second parts to the open unfolded position,
wherein, in the closed folded position the terminal is inactive for outgoing communications; and
a button, user-operable in the closed folded position when the terminal is inactive for out-going communications, enabling the user to trigger the portable terminal not to operate responsive to the contents of the incoming communications upon opening the first and second parts from the closed folded position to the opened unfolded position so that the user operating the button results in the portable terminal being ready for immediate out-going communications but not operating responsive to the contents of the incoming communications when being transferred from a folded condition into an opened condition and the activation part not activating the terminal for out-going communications in the specific communication mode determined by the selector.

15. The terminal of claim 14, wherein when an incoming voice communication is received, the activation part determines that the content data type is voice communications and the terminal is activated, upon opening, for out-going voice communications so that the user, after opening the terminal, immediately begins out-going voice communications.

16. The terminal of claim 15, wherein when an incoming mail communication is received, the activation part determines that the content data type is a mail communication and the terminal is activated, upon opening, for out-going mail communications.

17. The terminal of claim 16, wherein,
for incoming mail communication, when the terminal is transferred from a folded condition into an opened condition after reception of mail data, the terminal selects a function for using the data and then uses the data by the selected function, the selected function including displaying image data in a display portion.

18. The terminal of claim 17, wherein,
the terminal further comprises means for determining whether an incoming communication is from persons who have previously been registered by the user, and
the activation part activates the terminal for out-going communications when the incoming communication is determined to be from a registered person.

19. The terminal of claim 17, wherein when an incoming data communication is received, the activation part determines that the content data type is a data communication and the terminal is activated, upon opening, for data communications.

20. The terminal of claim 19, wherein, when the incoming communication is determined to be data communication, a virus check is automatically carried out.

* * * * *